June 4, 1963  S. ROMANCHUK ETAL  3,091,969
POWDER METAL SAMPLING DEVICE
Filed April 4, 1961
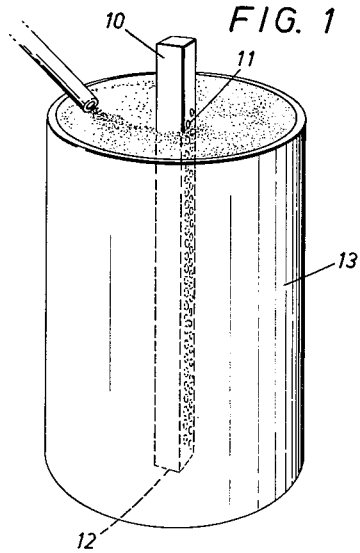
FIG. 1
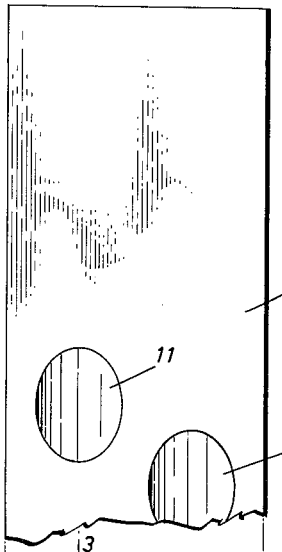
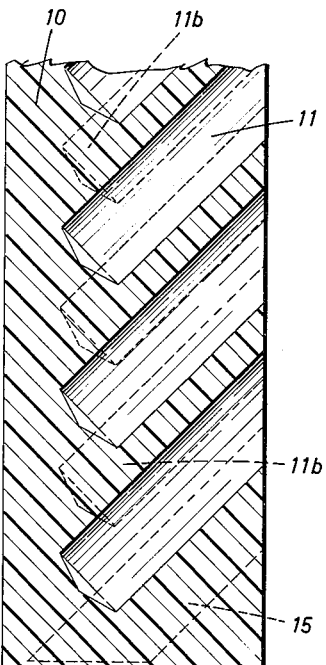
FIG. 3
FIG. 2
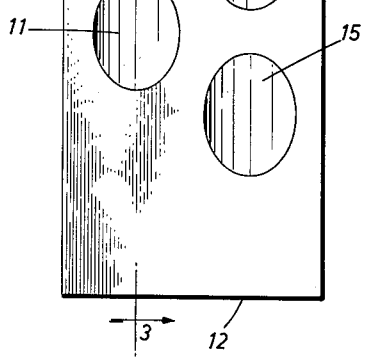
Inventors
STEVE ROMANCHUK
CYRIL R. MILLS
Attorney

United States Patent Office 3,091,969
Patented June 4, 1963

3,091,969
POWDER METAL SAMPLING DEVICE
Steve Romanchuk and Cyril R. Mills, Fort Saskatchewan, Alberta, Canada, assignors to Sherritt Gordon Mines Limited, Toronto, Ontario, Canada, a company of Ontario
Filed Apr. 4, 1961, Ser. No. 100,649
3 Claims. (Cl. 73—425.2)

This invention relates to a sampling device. It is particularly directed to a device for obtaining an accurately representative sample of a liquid or a granular material or a slurry of solid particles dispersed in a solution.

It is essential, in the operation of industrial plants, to obtain accurately representative samples of solids, liquids, and slurries at various stages of the operations conducted in a plant and of intermediate and final products for the purpose of inspection and analysis. Devices for obtaining representative samples are well known and are widely used in industry. The device and the method employed in sampling in a particular instance depends upon the characteristics of the material to be handled.

In sampling liquid or granular material, it is essential that the sample taken of the total bulk of the material should be accurately represented by the sample in physical and/or chemical properties. However, the accurately representative sample must be of a relatively small quantity for convenience in handling for inspection or analysis. It is necessary to obtain a sample which is identical with the material in all its properties except in bulk and, preferably, in a relatively small quantity. Too large a sample must be cut to a smaller volume and the cutting procedure may be expensive and time consuming and may produce a final sample for inspection or anlysis which is not accurately representative of the material sampled.

The sampling device of this invention can be employed in sampling liquid and slurries of liquid and solid particles. It is particularly adapted, however, to sampling granular material having free flowing characteristics, such as relatively dry metal powder.

The sampling device of this invention is in the form of an elongated body which is self-supporting in a vertical position and is formed with a plurality of spaced, downwardly extending holes in at least one vertical face thereof adapted to receive and retain flowable material, when standing in a vertical position, as it is poured into a container.

An understanding of the sampling device of this invention and the manner in which it can be employed to obtain an accurately representative sample of flowable material being fed into a container can be obtained from the following description, reference being made to the accompanying drawing, in which:

FIGURE 1 is an elevation in section of a container adapted to receive flowable material with the sampling device of this invention positioned vertically therein with the holes facing away from the direction of pouring;

FIGURE 2 is a front view; and

FIGURE 3 is an elevation in section taken along the lines 3—3, FIGURE 2.

Like reference numerals refer to like parts throughout the description and drawing.

The sampling device illustrated in FIGURE 1 is in the form of a body 10 which is formed of rigid, self-supporting material which, preferably, is resistant to corrosion and abrasion by material with which it comes in contact. Material such as steel, iron, copper or other metal, wood, plastic or other rigid, self-supporting material can be used. We have found that if the body 10 is formed of a rigid, self-supporting plastic, it is rugged, relatively light and the holes 11 and 11b can be readily and accurately formed by drilling. Preferably, a transparent plastic is used so that the sampler can see that the holes are empty and the device is clean before use. As illustrated, the body 10 is of a rectangular shape having a width and thickness sufficient to define the downwardly extending holes 11—11b which are described in detail hereinafter, and to provide a base 12 on which it can be stood in a vertical position. Alternatively, of course, the base 12 can be formed as a separate piece and attached to the bottom of the body.

Spaced holes 11—11b are formed, such as by drilling, in at least one face of the body and extend downwardly a predetermined depth, as measured when the body is standing in a vertical position, and terminate within the body. The spacing, diameter and depth of the holes can be designed readily having regard to the characteristics of the flowable material to be sampled and the amount and the accuracy of the sample desired. For example, if a very accurate sample is desired, two or more rows of holes can be provided in staggered relation along the length of the face, as illustrated by the rows of holes 11 and 11b shown in the drawing. The staggering of the holes is arranged to expose an entrance to a hole at each point along the length of the body between the uppermost and lowermost holes so that samples of material are taken from all levels of the container as it is filled with the flowable material. The lowermost holes 15, which are of shallower depth than the holes 11, can be of greater diameter to receive the same quantity of sample as is received in the holes 11.

The holes are, of course, of uniform diameter and depth in order to obtain a representative sample of uniform volume at each level of the container. The diameter must be, of course, greater than the size of the largest particle to be received therein. In sampling finely divided metal particles of from about 1 micron to about 2000 microns in size, we have had very satisfactory results when using a diameter of about five-eighths of an inch. The size of the sample, of course, is determined by the diameter and depth of the holes. The angle of the holes to the horizontal when the body is in a vertical position also is important in order to retain the sample in the holes without spillage as the body is withdrawn from the container. We have found that an angle to the horizontal of from about 30° to about 60° is satisfactory. In the embodiment of the device illustrated in the drawing, the angle is about 45°. The device can be readily designed to collect a sample of predetermined overall volume by increasing or reducing the diameter and depth of the holes.

The device is very easily installed and used. It is placed in a vertical position on the bottom of a container, such as the container 13 illustrated in FIGURE 1, with the holes facing away from the stream of material. Preferably, the device is of a height sufficient to reach the top of the container. The holes 11 and 11b from the bottom to the top of the device fill with material as it rises in the container. When the desired amount of material has been fed into the container, the device is lifted out without spillage and can be emptied into a sample container and then inserted in the next container being filled.

We have found the sampling device of this invention to have important advantages over conventional sampling devices, particularly when used for taking an accurately representative sample of a flowable material as it is fed into a container for storing or shipping.

The device can be used with advantage in taking samples extremely accurately representative of granular material, for example, finely divided solid particles, liquids and slurries of liquids and solid particles. We have found it to be of particular advantage in taking samples of finely divided particles of metal as they are fed into containers for shipping or storage. Samples of small size can be obtained without spillage which are very easily handled in testing and analysis and which are extremely accurate representations of the metal particles fed into the container.

It will be understood, of course, that modifications can be made in the preferred embodiment of the sampling device described and illustrated herein without departing from the scope of the invention as defined by the appended claims.

What we claim as new and desire to protect by Letters Patent of the United States is:

1. A sampling device which comprises an elongated, self-supporting body adapted to stand in a vertical position, a plurality of downwardly extending holes arranged in spaced, staggered relation along a face of said body to expose an entrance to a hole at each point along the length of said body defined by the uppermost and lowermost hole, said holes being adapted to receive and retain flowable material when standing in a vertical position.

2. A sampling device which comprises an elongated, self-supporting body adapted to stand in a vertical position, a plurality of holes downwardly extending at an angle to the horizontal within the range of from about 30° to about 60° arranged in spaced, staggered relation along a face of said body to expose an entrance to a hole at each point along the length of said body defined by the uppermost and lowermost hole, said holes being adapted to receive and retain flowable material when standing in a vertical position.

3. A sampling device which comprises an elongated, self-supporting body adapted to stand in a vertical position, a plurality of downwardly extending holes of substantially equal volume arranged in spaced, staggered relation along a face of said body to expose an entrance to a hole at each point along the length of said body defined by the uppermost and lowermost hole, said holes being adapted to receive and retain flowable material when standing in a vertical positon.

References Cited in the file of this patent

UNITED STATES PATENTS

| | | |
|---|---|---|
| 143,953 | Bois | Oct. 28, 1873 |
| 230,121 | Frost | July 20, 1880 |
| 243,948 | Newell | July 15, 1881 |
| 460,666 | Stacy | Oct. 6, 1891 |
| 1,078,847 | Grauenfels | Nov. 18, 1913 |